Sept. 23, 1930.   P. McSHANE   1,776,518
DYNAMO ELECTRIC MACHINE
Filed July 7, 1928   2 Sheets-Sheet 1

INVENTOR
Phelan McShane.
BY
[signature]
ATTORNEY

Sept. 23, 1930.   P. McSHANE   1,776,518
DYNAMO ELECTRIC MACHINE
Filed July 7, 1928   2 Sheets-Sheet 2
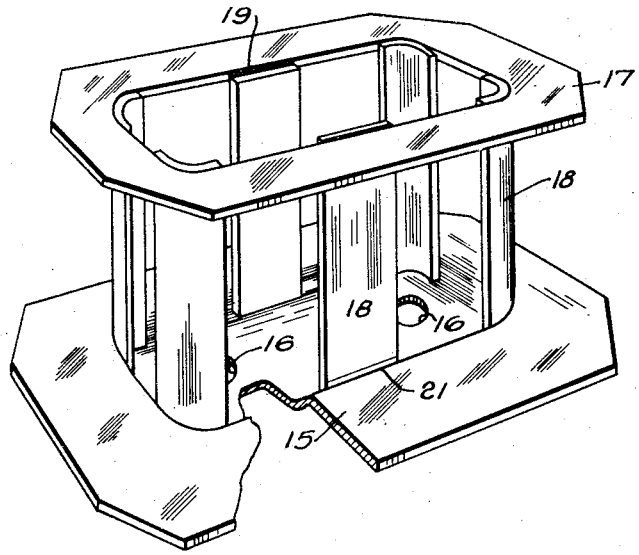
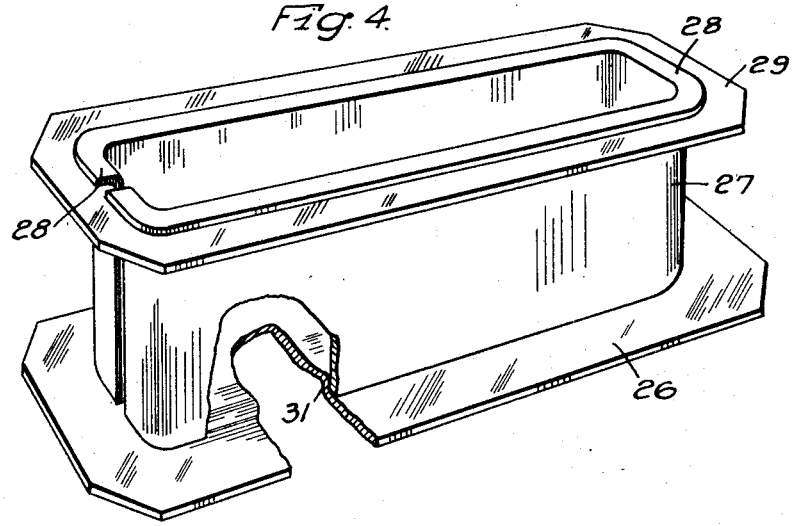
INVENTOR
Phelon McShane
BY
*(signature)*
ATTORNEY Patented Sept. 23, 1930

1,776,518

UNITED STATES PATENT OFFICE

PHELAN McSHANE, OF PITTSBURGH, PENNSYLVANIA, ASSIGNOR TO WESTINGHOUSE ELECTRIC & MANUFACTURING COMPANY, A CORPORATION OF PENNSYLVANIA

DYNAMO-ELECTRIC MACHINE

Application filed July 7, 1928. Serial No. 290,988.

My invention relates to dynamo-electric machines, and more particularly to field-coil structures thereof.

Heretofore, the field coils of a dynamo-electric machine have been usually mounted in their frame substantially as follows: A laminated or solid pole-piece carrying a previously-wound coil, was provided with sufficient insulating and other washers for filling and holding purposes and with metal spring washers, and the entire assembly was fastened to a pole piece of the frame by means of bolts.

In the first place, such an assembly was difficult to fasten rigidly to the frame because it was necessary to keep the washers properly aligned. For instance, one or more of the washers might so slide from its normal position under the bottom of the pole-piece that the pole-piece would be left in a slightly tilted position.

In the second place, it was seldom that a sufficient number of washers were added to establish a satisfactory pressure around the coil; consequently, the coils became loose, the washers would break, and coils were often crushed. Also, if vibration of the field coil was allowed to continue, because of looseness, the insulation became imparted by chafing on the pole-piece.

Even where heavy spring-washers were utilized, there was still movement and chafing of the coil because of a large solenoid effect resulting when starting or when abnormal loads were imposed on the motor, such conditions being frequent in mill-motor operations.

It is an object of my invention to provide a field-coil structure in which movement of the coil relative to the pole-piece is prevented.

It is another object of my invention to provide a structure whereby washers are not necessary.

It is a further object of my invention to provide a field-coil structure whereby the field coil is almost entirely enclosed in a metal shell and is thereby afforded protection from mechanical injury.

By my invention, I provide a shell or spool on which a field coil is found and which has a closed bottom portion having bolt-holes therein. The pole-piece is inserted in this shell against the bottom portion and both the shell and pole-piece are clamped tightly against the frame.

For a better understanding of my invention, reference may be had to the accompanying drawing, in which:

Fig. 3 is a perspective view of a coil-supporting shell embodying one form of my invention; and Fig. 4 is a perspective view of a coil-supporting shell embodying another form of my invention.

Figure 1:
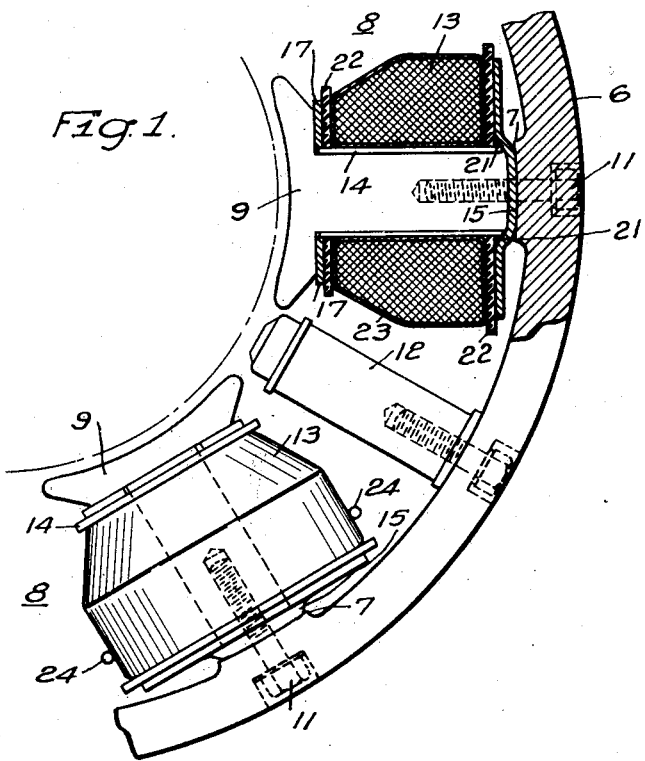
Figure 1 is a view, partially in elevation and partially in section, of a portion of a dynamo-electric machine embodying the field-coil structure of my invention.

In Fig. 1, is illustrated a stator frame 6 having inwardly raised portions 7 upon which my novel field-coil structures 8 are mounted. Pole-pieces 9 are inserted in the field-coil structure and are bolted to the frame by means of bolts 11. A commutating pole-piece 12, which may be constructed in accordance with my invention, is disposed between two adjacent field coils.

A field coil 13 is mounted upon a fabricated coil support taking the form of a shell or spool 14 which may be variously constructed, but which, according to my invention, has a closed end 15 provided with bolt-holes 16 and of substantially dish-shape to conform to the surface of the raised portion 7 of the frame to which it is bolted.

Figure 2:
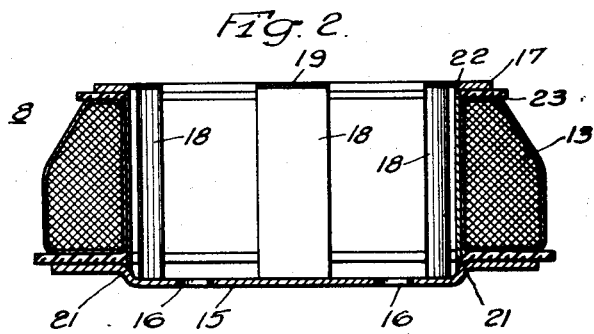
Fig. 2 is a detail sectional view of the field-coil structure of my invention.

As shown in Figs. 2 and 3, a washer or end piece 17 of the spool 14 is spaced from the end 15 by a plurality of spacers 18 and is welded to the ends thereof. It will be noted that the end of the spacer is located below the outer surface of the washer, as indicated at 19, in order that the weld joint shall be below such outer surface. The other ends of the spacers 18 are welded to the side walls or offset parts of the member 15, as indicated at 21, thereby providing means whereby the welding can be done externally of the spool.

In assembling the coil structure, the shell or spool is disposed in a winding machine and wire of proper gauge wound thereon. The coil-forms heretofore utilized are unnecessary because the shell itself constitutes a form.

Insulating material 22 may be disposed around the spacers, and the conductor wound in the usual manner, each layer, as the winding continues, being impregnated with liquid bakelite. The insulating material may be composed of a solid sheet material 22 disposed as shown in Fig. 2, and further insulation may comprise fabric sheet or tape 23. When the coil is completely wound, the ends of the sheet are overlapped and covered with insulating tape.

In most cases, only the fabric insulation 23 is necessary. Leads 24 may be provided in accordance with usual practice. In the finished structure, the coil being wound very tight, becomes substantially integral with the shell, and cannot work loose.

In Fig. 4 is shown another form of shell or spool in which the base portion is made differently. A base portion 26 is made to fit over the raised portion 7, and its flanged portion may engage the frame to be further supported thereby. A spacer 27 may be made of sheet material and has a flange portion 28 under which the washer 29 is disposed. The only welding operation necessary in this construction is at the base, as indicated at 31. The wire is wound on this shell by the same method as described above.

By my invention, I have provided a field-coil structure whereby the loose washers utilized heretofore are unnecessary, and, consequently, difficulties arising on account of loose parts are eliminated. I have also provided a structure which is simple to manufacture, and which is easy to assemble upon the frame of the machine.

I have illustrated my structure in connection with a stator frame, but I desire it to be understood that it can also be adapted for use in connection with rotating parts. It will be further understood that my structure also has application in apparatus of any type, either with or without pole pieces, as a means for supporting coils.

It is evident that changes may be made in the structure without departing from the spirit and scope of my invention, as defined by the appended claims.

I claim as my invention:

1. In a dynamo-electric machine, a frame, a pole piece, a coil-support of substantially spool shape but having a closed bottom portion provided with bolt holes, a field coil mounted on said coil support in intimate engagement therewith, said pole piece being inserted in said coil support and against said bottom portion, and clamping bolts projecting thru said bolt holes for fastening said coil support, its coil and said pole piece to said frame.

2. A supporting shell suitable for supporting a coil on a removable field pole piece of a dynamo-electric machine, characterized by having a spool portion comprising a tubular portion joined to flat parallel side walls between which the coil may be wound, and further characterized by having a base member closing one end of said tubular portion and adapted to be clamped under said removable pole piece.

3. A salient-pole dynamo-electric machine having a removable polar member, a coil for said polar member, and a supporting shell for said coil, characterized by having a spool portion comprising a tubular portion joined to open side walls between which the coil may be wound, and further characterized by having a base member closing one end of said tubular portion and adapted to be clamped under said removable polar member.

4. A supporting metal shell suitable for supporting a coil on a removable pole piece of a dynamo-electric machine, characterized by having a spool portion comprising a tubular portion joined to side walls for tightly engaging the ends of said coils, and further characterized by having a base member closing one end of said tubular portion and adapted to be clamped under said removable pole piece.

5. A supporting metal shell suitable for supporting a coil on a removable pole piece of a dynamo-electric machine, characterized by having a spool portion comprising a tubular portion joined to open side walls between which the coil may be wound, and further characterized by having a base member closing one end of said tubular portion and adapted to be clamped under said removable pole piece, the base member and one of said side walls being an integral piece dished at its center to provide a shoulder alongside which the tubular portion fits, and a welded joint between said shoulder and said tubular portion.

In testimony whereof, I have hereunto subscribed my name this 25th day of June, 1928.

PHELAN McSHANE.